United States Patent
Chadha et al.

(10) Patent No.: US 7,997,019 B2
(45) Date of Patent: Aug. 16, 2011

(54) APPARATUS AND METHOD FOR GENERATING STEAM

(75) Inventors: Jasmeet Singh Chadha, Singapore (SG); Chandra Mohan Janakiraman, Singapore (SG); Tamilselva Thirumazhisai Sankaralingam, Singapore (SG); Hock Soon Tiew, Singapore (SG); Boon Khian Ching, Snoqualmie, WA (US); Yong Jiang, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 449 days.

(21) Appl. No.: 12/160,899

(22) PCT Filed: Jan. 15, 2007

(86) PCT No.: PCT/IB2007/050119
§ 371 (c)(1),
(2), (4) Date: Jul. 15, 2008

(87) PCT Pub. No.: WO2007/083259
PCT Pub. Date: Jul. 26, 2007

(65) Prior Publication Data
US 2010/0223820 A1    Sep. 9, 2010

(30) Foreign Application Priority Data
Jan. 17, 2006    (EP) .................................. 06100442

(51) Int. Cl.
*D06F 75/06* (2006.01)
*D06F 75/40* (2006.01)

(52) U.S. Cl. ........................................ 38/77.6; 38/77.83
(58) Field of Classification Search ................ 38/74, 75, 38/77.1, 77.3, 77.6–77.81, 77.83, 85, 88; 219/245–248, 254; 68/222
See application file for complete search history.

(56) References Cited

U.S. PATENT DOCUMENTS

| | | | | |
|---|---|---|---|---|
| 2,435,325 | A | 8/1944 | Reichold | |
| 3,262,146 | A * | 7/1966 | Hays | 15/321 |
| 3,707,855 | A * | 1/1973 | Buckley | 68/6 |
| 5,832,639 | A * | 11/1998 | Muncan | 38/77.6 |
| 5,915,071 | A | 6/1999 | Harbin, III | |
| 6,640,472 | B1 | 11/2003 | Wu | |
| 6,678,973 | B2 * | 1/2004 | de Mori | 38/77.6 |
| 7,360,328 | B2 * | 4/2008 | Fung | 38/77.6 |
| 2005/0160635 | A1 | 7/2005 | Chen | |
| 2005/0211306 | A1 | 9/2005 | Dulac | |

FOREIGN PATENT DOCUMENTS

| | | |
|---|---|---|
| EP | 0330034 A1 | 8/1989 |
| EP | 0423540 A1 | 4/1991 |
| EP | 0563506 A1 | 10/1993 |
| EP | 1300503 A1 | 4/2003 |
| FR | 2512473 A1 | 3/1983 |
| FR | 2543180 A1 | 9/1984 |
| FR | 2714401 A1 | 6/1995 |
| GB | 2256652 A | 12/1992 |
| WO | WO2004055255 A1 | 7/2004 |

* cited by examiner

*Primary Examiner* — Ismael Izaguirre

(57) ABSTRACT

A steam generating apparatus includes a boiler for receiving water to be heated and an opening in a wall of the boiler. The opening is closable by a closing device. The steam generating apparatus also includes a steam duct for conducting steam generated in the boiler to a steam applying device such as an iron. A by-pass duct for by-passing the steam duct is provided for discharging steam from the boiler to the iron.

9 Claims, 10 Drawing Sheets

APPARATUS AND METHOD FOR GENERATING STEAM

FIELD OF THE INVENTION

The present invention generally relates to steam generating apparatuses and to a method of operating a steam generating apparatus. In particular, the invention relates to steam generating apparatuses with a limited or unlimited water reservoir.

BACKGROUND OF THE INVENTION

The supply of water to be vaporized in steam generating apparatuses may be provided by a water reservoir, thus allowing for a limited autonomy in certain household appliances. The water stored for an operation cycle is heated by heating means in a boiler. The generated steam can be applied without the need of the steam generating apparatus being coupled permanently to a permanent water supply, e.g. a water conduit. In consequence, the steam generating apparatus, i.e. its water reservoir, has to be refilled regularly. Therefore, a water-filling opening for (re-) filling the boiler manually after each operation cycle is provided. The water-filling inlet commonly is cup-shaped to allow for easy refilling by the user and may be closed/opened by a cap. Usually the boiler forms the water reservoir or is directly coupled to it. Thus, the boiler is pressurized by the steam pressure. In addition to the water-filling opening a draining opening may be provided for draining off water and debris from the boiler. A further possibility is using one single opening for filling and draining purposes.

Besides the mentioned limited systems, unlimited systems are known. In these systems the boiler is permanently connected to an unlimited water supply and the boiler is generally provided with a dedicated draining opening.

These designs raise a number of disadvantages and hazards for the user: Refilling or cleaning the boiler after waiting for the boiler to cool down is time consuming. Opening the boiler with steam pressure present inside the boiler forces steam outside while opening the cap. This hot steam endangers the user. Further, water being poured into the boiler during refilling may be vaporized instantaneously due to heat surfaces inside the boiler (e.g. boiler shell, heating plate). This undesirably generated steam escapes through the opening in the boiler. Typically the user wants to minimize the time needed for refilling the boiler and tries to pour as much water per time as possible by filling the cup-shaped water inlet. In these situations he frequently experiences water splashing out of the boiler opening.

It is an object of the invention to provide an apparatus and a method of operating a steam generating apparatus having improved water-refilling and draining capabilities.

SUMMARY OF THE INVENTION

In accordance with the invention, there is provided a steam generating apparatus comprising a boiler for receiving water to be heated, an opening in a wall of the boiler, the opening being closable by closing means, and a steam duct for conducting steam generated in the boiler to steam applying means, wherein a by-pass duct by-passing the steam duct is provided for discharging steam from the boiler to the steam applying means. No steam can flow through the by-pass duct during normal operation, i.e. while generating steam for applying it. Before or while opening the opening by removing the closing means, the by-pass duct may be opened. Before the closing means are fully opened and before the steam is to leave the opening, the steam passes the by-pass duct. Thus, the user can safely open the boiler of the steam-generating device without any significant pressure remaining inside the boiler.

According to a particular embodiment of the present invention, the steam applying means is an iron. Since the iron is used for applying the steam in normal operation, releasing the steam via the iron is a safe and cost effective way of lowering the pressure inside the boiler.

According to a preferred embodiment of the invention, the opening is a water filling means for manually filling water into the boiler. Thus, the safety of the water filling operation is improved.

Further, it is possible that the opening is a rinsing outlet for draining off water from the boiler. Therefore, also the rinsing operation of the boiler becomes safer.

In accordance with a preferred embodiment of the invention, the closing means additionally close the by-pass duct. Extending the operation of the closing/opening means of the boiler opening onto the by-pass duct facilitates the timing of the respective operations. Preferably, the by-pass duct is opened before the boiler opening is fully open, as discussed above.

Particularly, the water filling means and the closing means are connected by a screw thread coupling. For example, an internal (female) thread is arranged at the boiler opening and the closing means comprises an external thread forming a screw. Further, a by-pass duct branching may be arranged in the region covered by the internal thread of the boiler opening. Thus, by screwing the closing means into the open end of the boiler opening, the opening is being closed. At the same time, the branching part of the by-pass duct is also being closed.

According to a further embodiment, the closing means are realized as a boiler outlet valve to which the by-pass duct is connected, wherein in a first position the valve closes the boiler and disconnects the boiler from the by-pass duct, in a second position the valve closes the boiler and connects the boiler with the by-pass duct, and in a third position the valve opens the boiler. The valve can be of a ball or plug type. Besides the mentioned positions, intermediate positions can be taken. The third position in which the boiler is open to atmosphere can be further characterized by connecting the boiler to or by disconnecting the boiler from the by-pass duct.

According to a still further embodiment, the by-pass duct comprises a mechanically operable valve for closing and opening the by-pass duct. For example, the valve can be operated by a push button.

The invention further relates to a method of operating a steam generating apparatus comprising a boiler for receiving water to be heated, an opening in a wall of the boiler, the opening being closable by closing means, and a steam duct for conducting steam generated in the boiler to steam applying means, wherein the method comprises the step of discharging steam through a by-pass duct by-passing the steam duct from the boiler to the steam applying means.

Preferably, the step of discharging is performed by opening a closing means that is provided for closing a water filling and/or draining opening of the boiler.

Further advantages can be achieved by a steam generating apparatus comprising a boiler for receiving water to be heated, and a water filling means for manually filling water into the boiler, the water filling means having a filling end and a boiler inlet end, wherein the filling end has a cross section being smaller, equal or up to 50% wider than the cross section of the boiler inlet end. According to prior art the inner diameter of the filling end of the water filling means is enlarged compared with the boiler inlet end in order to facilitate the pouring of the water by providing a filling funnel or cup. According to the invention is has been found that the disadvantageous splashing out of water is related to the following effect related to the mentioned design. The pouring water fills the inner diameter of the opening of the boiler and steam leaving the boiler—as mentioned above—has to penetrate the damming water in the funnel-shaped water filling inlet. As a result, the water splashes out of the water-filling inlet due to the escaping steam. This provides a different design of the filling means having an inner diameter, which is essentially constant or even increasing. Thereby, a damming-free pouring of the water into the boiler is possible. The water filling means may be made of one piece or alternatively may comprise several, preferably two components forming the filling end and the boiler inlet end. For example, the filling end may be part of the plastic construction surrounding it. A filling end cross section equal to the boiler inlet end cross section can particularly be realized by an essentially constant cross section of the water filling means. The term "essentially constant" refers to the fact, that small projections, protrusions, edges (perpendicular to or in direction of the water flowing direction), or even a small narrowing in the water filling means, which are not suitable to impede the water flow and do not reduce the inner diameter of the water filling means significantly, are to be considered as being in the scope of the invention.

According to a preferred embodiment, the filling end has a cross section being up to 20% wider than the cross section of the boiler inlet end. This is an example for a wide variety of relative cross sections that can be the basis of the present invention. According to further preferred embodiments, the cross section of the filling end is up to 40%, up to 30%, or up to 10% wider than the cross section of the boiler inlet end. The water filling means may become wider from the filling end to the boiler inlet end by up to 5%, up to 10%, up to 20%, up to 40%, up to 70%, or up to 100%.

It is advantageous that the water filling means comprises an elbow shaped bending. An appropriate orientation of the elbow bending allows for steam to leave the boiler, while water is poured into the water filling means. The water flowing into the boiler is in contact with the wall of the bending directed outwards the bending, whereas in the area of the wall facing inwards the bending steam from inside the boiler may leave. Further, the elbow bending may be used to direct the water flow primarily onto the boiler shell, thus producing a thin water film. This reduces the probability of water splashing out of the boiler.

According to a preferred embodiment, the inner diameter of the boiler inlet end is at least 15 mm, preferably between 15 mm and 35 mm.

Further advantages can be achieved by a method of controlling the steam pressure in a steam generating apparatus comprising a boiler for heating water, the boiler comprising an opening for filling water into the boiler manually, and heating means, the method comprising the steps of controlling the steam pressure in the boiler on the basis of a target pressure level, obtaining a boiler opening request, and lowering the steam pressure in response to the request before opening the boiler. In normal operation mode, the steam inside the boiler of the steam generating apparatus is controlled on a certain pressure level. If an opening of the boiler is requested, e.g. by a sensor signal, a triggering signal, a switch signal, etc., the steam pressure inside the boiler is lowered to a level convenient for opening the boiler. Therefore, the problems and hazards mentioned above are avoided, since the danger of hot steam leaving the boiler opening under high pressure is no longer present.

According to a preferred embodiment, the step of lowering the steam pressure comprises at least one of the following steps: connecting the boiler with the atmosphere by opening a valve and lowering the heating power. Depressurizing the boiler by connecting it with the atmosphere is a fast and simple way of adapting the steam pressure inside the boiler to a non-hazardous level. Reducing the heating power emitted into the boiler or deactivating the heating means is slower, but prevents the undesired generation of steam during pouring in water through the boiler opening. Preferably, the step of connecting the boiler with the atmosphere and lowering the heating power are combined.

According to a further embodiment, the step of connecting the boiler with the atmosphere by opening a valve comprises at least one of the following steps: connecting the boiler via a steam duct with a steam applying means; and connecting the boiler via a by-pass duct by-passing the steam duct with a steam applying means. Releasing the steam present inside the boiler before opening it through a steam duct connected with the steam applying means avoids any hazard to the user, since this is the regular way of applying the steam during operation. Further, this embodiment is easy to implement in present products, since the elements needed are already present. Alternatively or additionally, the boiler may be connected with the atmosphere via a by-pass duct. This by-pass duct may start for example, as already discussed above, at a water filling means and may be coupled to the steam duct before entering the steam applying means, e.g. the iron. Further, the by-pass duct may also connect the boiler with the atmosphere via an additional opening. In this case, a safe, non-hazardous release of the steam has to be provided.

According to a particular embodiment, the step of obtaining a boiler opening request comprises at least one of the following steps: obtaining a user indicated boiler opening request; obtaining a sensor signal indicating that the boiler water level is below a minimum water level; and obtaining a temperature sensor signal indicating that the boiler temperature is above a maximum temperature level. A simple way of generating a boiler-opening request is by providing a switch or a push button to be activated by the user. As a result, the user is able to override the triggering of the heating means performed in order to control the steam to a target level by opening the valve manually or deactivating the heating means. This allows the user to refill the boiler at any time during the normal operation. Alternatively or additionally, the lowering of the pressure level may be initiated by obtaining a sensor signal indicating a low water level. This water level signal may be provided by an appropriate sensor, including a temperature sensor or a pressure sensor. Further, a temperature signal indicating a temperature exceeding a predetermined level may also be used to trigger the steam injection via the steam duct or the by-pass duct or to trigger lowering the heating power. The steps of controlling the pressure level to a target level, obtaining a boiler opening request and lowering the pressure inside the boiler may be performed by an electronic control system controlling the various functions of the steam generating apparatus.

These and other aspects of the invention will be apparent from and elucidated with reference to the embodiments described hereinafter.

DESCRIPTION OF PREFERRED EMBODIMENTS

Figure 1A:
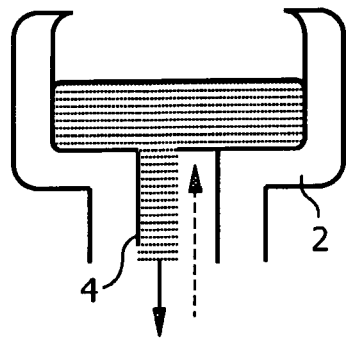
FIGS. 1a and 1b show a water inlet portion of a steam-generating device according to the state of the art.
Figure 1B:
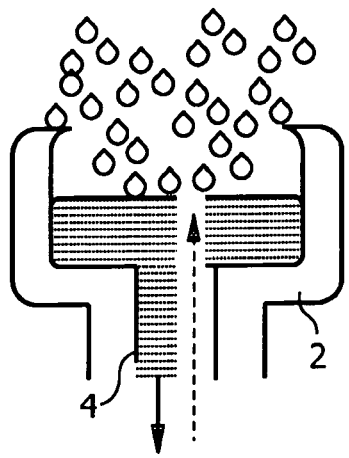

FIGS. 1a and 1b illustrate the situation of water refilling in steam generating apparatuses according to the state of the art. When the water reservoir of the steam generating apparatus is emptied during operation, the inner surfaces of the boiler (shell, heating plate; not shown) are usually still hot, when the user is beginning to refill water. To facilitate the refilling, a cup-shaped or funnel-shaped water inlet 2 is provided. The user usually wants to minimize the time required for the refilling process and tries to pour as much water as possible. Due to the cup-shaped form of the water inlet 2 and the narrower inner diameter of the pipe 4 leading to the boiler, the water inlet 2 is initially completely filled with water. The cold water being poured in gets in contact with the hot inner surfaces of the boiler and evaporates immediately. This undesirably generated steam escapes through the water filling inlet pipe. This situation is shown in FIG. 1a, where the water being poured in meets the steam escaping the boiler. Since the amount and speed of the steam are considerable, the situation shown in FIG. 1b happens: The water in the inlet cup 2 is carried along or displaced and splashes out of the water inlet cup 2. This is an uncomfortable and unsafe situation for the user.

Figure 1C:
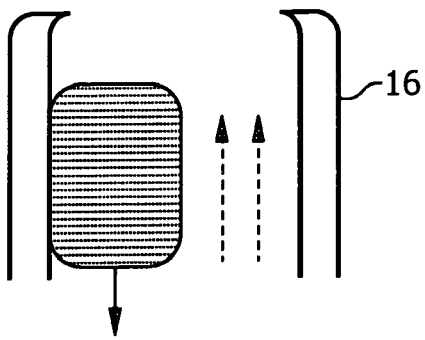
FIG. 1c shows a water inlet portion of a further steam-generating device.
Figure 1D:
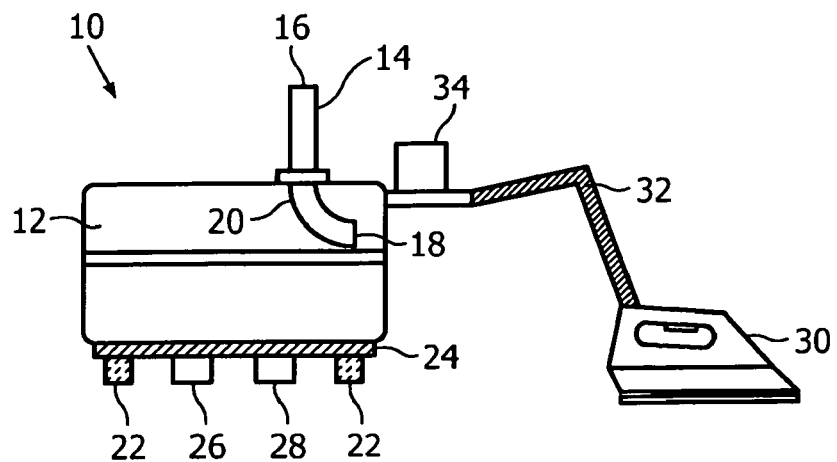
FIG. 1d shows a setup of a steam generating apparatus.

FIGS. 1c and 1d illustrate a faster and safer refilling. FIG. 1c is a detailed cross sectional view of the filling end 16 of the water filling inlet pipe 14 of the steam generating apparatus 10 (FIG. 1d). The steam generating apparatus 10 comprises a boiler 12 for heating water. The boiler is equipped with heating elements 22 being in a thermal contact with a heating plate 24 at the bottom of the boiler 12. Further, temperature switches 26, 28 are provided. The water filling inlet pipe 14 comprises besides the filling end 16 an elbow-like bending portion 20 and a boiler inlet end 18. The boiler 12 is connected with an iron 30 via a steam hose 32. An electro-valve 34 is provided for the steam hose 32 between the boiler 12 and the iron 30. The detail operation of the steam generation, delivering the steam from the boiler 12 to the iron 30 and applying the steam is discussed in more detail relating to the embodiments to follow. As depicted in FIG. 1c, by providing an inner diameter of the water filling inlet pipe 14, which is constant or increasing from the filling end 16 to the boiler inlet end 18 by omitting the cup-shaped inlet portion, as can be seen in FIGS. 1a and 1b, and by providing a wider inner diameter the problems mentioned above can be avoided. The wider inner diameter of the water filling inlet pipe 14 allows for faster refilling by reducing the filling time by 30-50% and provides a better visibility of the water level for the user. Omitting the cup form prevents water damming at the filling end 16 of the water filling inlet pipe 14. Air and steam are allowed to leave the boiler without colliding with water closing the filling end 16. Further, the water filling inlet pipe 14 comprises an elbow 20 to prevent steam from splashing through the water filling inlet pipe 14. Additionally, the elbow shape causes water being poured in, to flow down the vertical surfaces of the boiler 12. In consequence, the steam generated primarily hits the shell first, making it safer for the user. Further, the formation of a thin water film is enhanced, which facilitates the prevention of a sudden steam generation. These features can also be combined with a tilting of the boiler by five to ten degrees.

Figure 2:
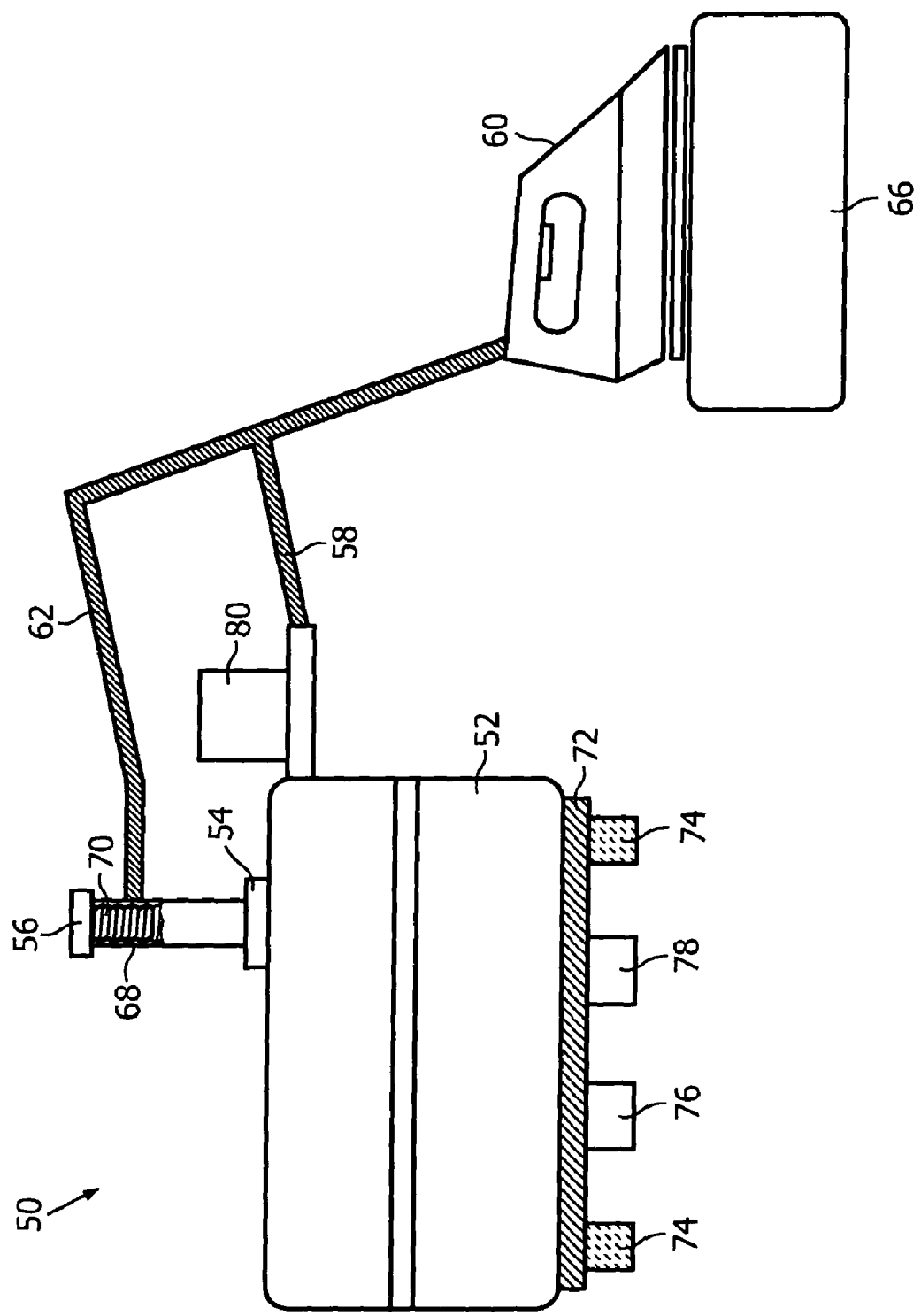
FIG. 2 shows a steam generating apparatus according to the invention.

FIG. 2 shows a steam generating apparatus according to the present invention. The steam generating apparatus 50 comprises a boiler 52 for heating water. The bottom of the boiler 52 is in thermal contact with a heating plate 72. The heating element 74 as well as two temperature switches 76, 78 are also thermally connected with the heating plate 72. The boiler 52 is provided with an electro-valve 80 coupled with a steam duct 58 connecting the boiler 52 with a steam applying means, e.g. an iron 60. A stand 66 is provided for the iron 60. The boiler 52 further comprises water filling inlet pipe 54. The water filling inlet pipe 54 is provided with an inner thread 68 being connectable with a screw 56 having threads 70. In that portion of the water filling inlet pipe 54, where the thread 68 is arranged, a branching of a by-pass duct 62 connecting the water filling inlet pipe 54 and the steam duct 58 is provided.

During steam generating operation, the screw 56 is completely screwed into the thread 68, thus closing the water filling inlet pipe 54 and the by-pass duct 62. If the user has to refill the boiler 52 because of a lack of water, he unscrews the screw 56. During the slow transversal movement of the screw 56 inside the water inlet-filling pipe 54 the branching of the by-pass duct 62 is opened. Then steam present inside the boiler 52 is able to leave the boiler 52 via the branching of the water filling inlet pipe 54 and the by-pass duct 62. Thus, the boiler 52 is depressurized by coupling the inside of the boiler 52 with the atmosphere, in this case over the iron 60. The generated steam inside the boiler leaves the boiler 52, which is thus depressurized before the screw 56 has completely been removed. The by-pass duct 62 may be connected with the steam duct 58 or directly connected with the iron 60.

Figure 3:
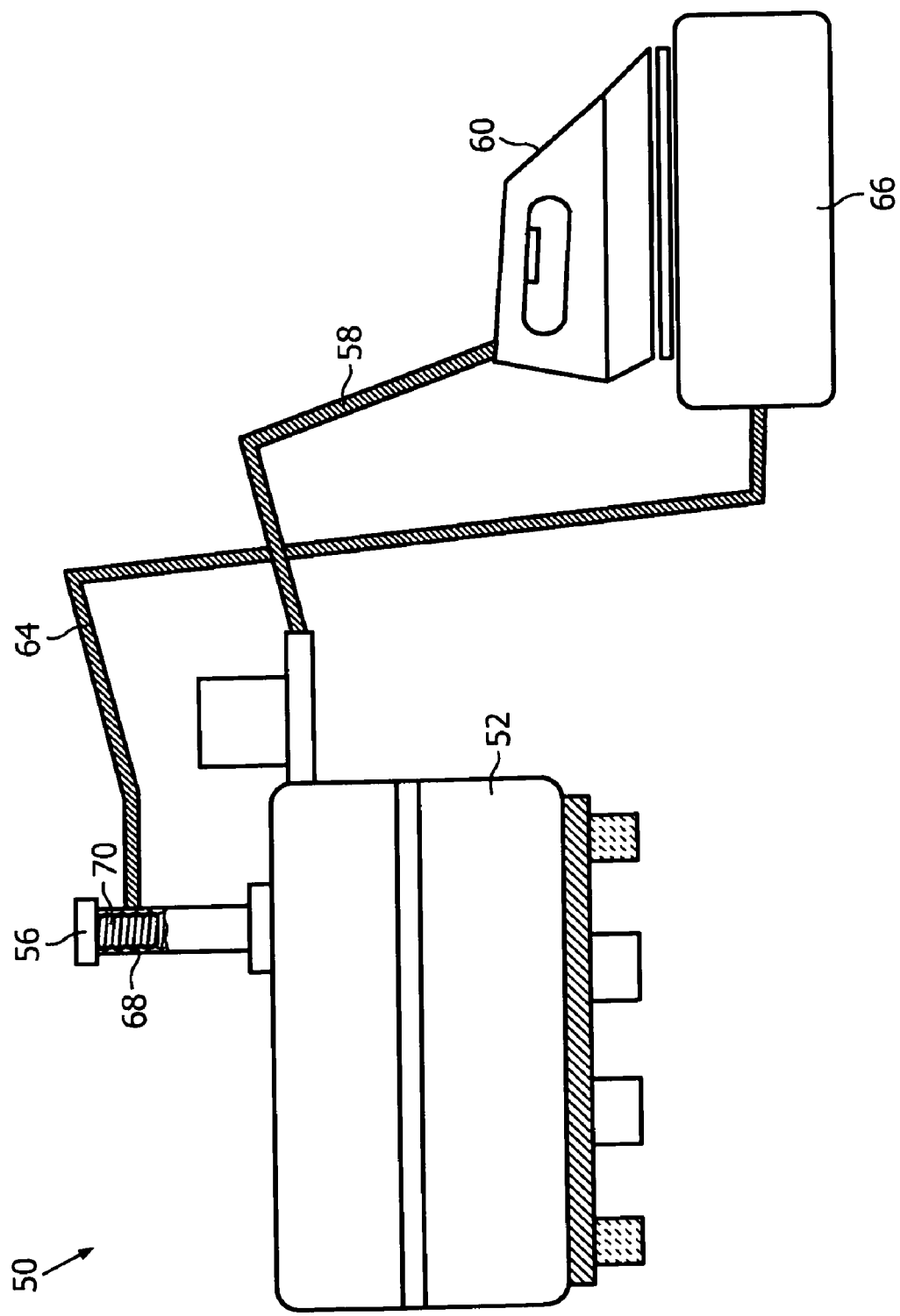
FIG. 3 shows a further steam generating apparatus.

As shown in FIG. 3, a by-pass duct 64 connecting the water filling inlet pipe 54 directly with the stand 66 may be provided. Depending on the overall construction of the steam generating apparatus 50 either the iron 60 or the stand 66 may be preferred for emitting the steam before opening the boiler 52 in a safe way.

Figure 4:
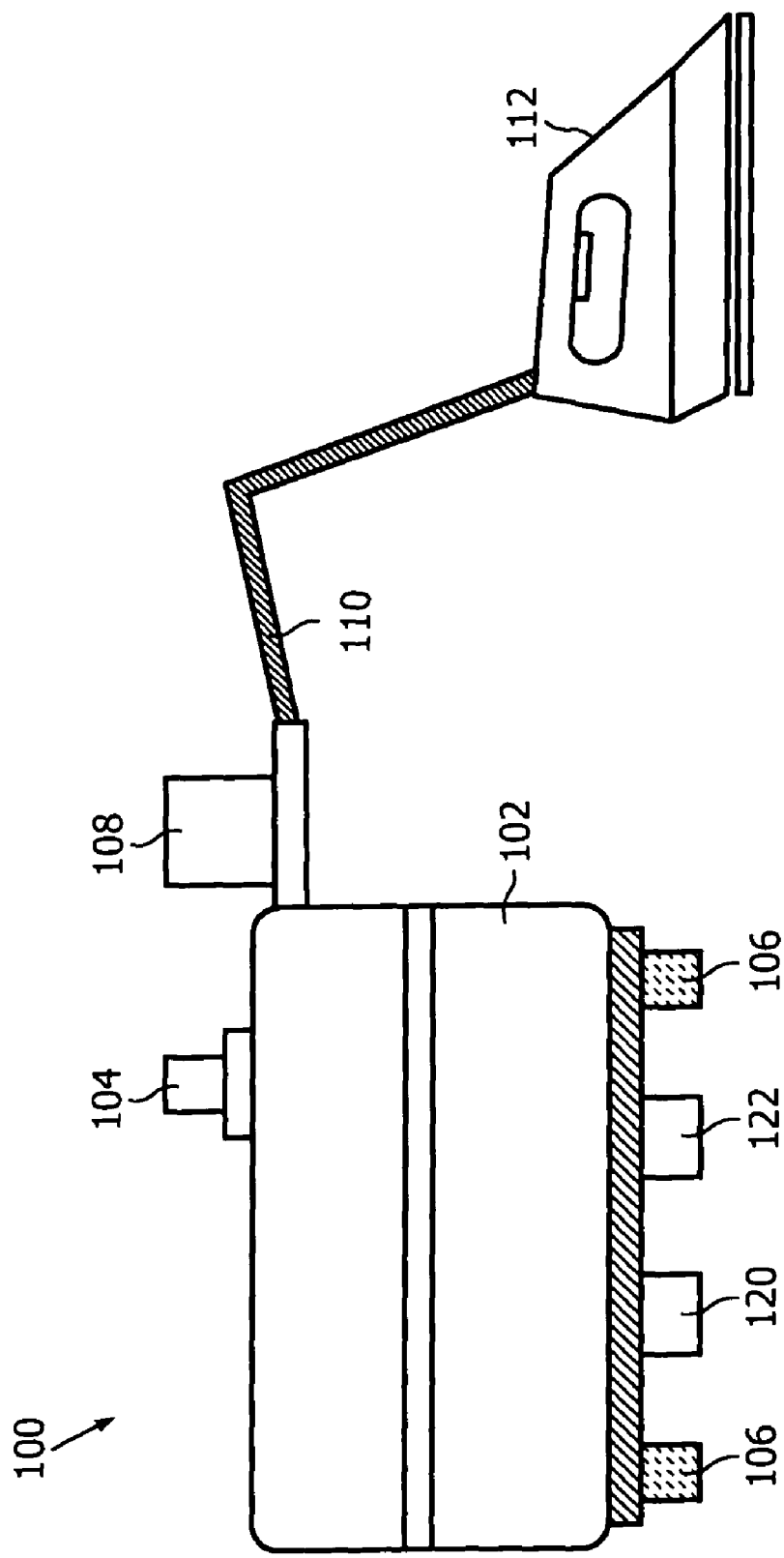
FIG. 4 shows a still further steam generating apparatus.

FIG. 4 shows a further steam generating apparatus. The steam generating apparatus 100 comprises a boiler 102, comprising a water inlet 104, heating elements 106 and two temperature switches 120, 122. The boiler 102 is connected via a steam duct 110 with an iron 112. The steam duct 110 may be closed and opened with an electro-valve 108.

In operation, the temperature switch 120 operates the electro-valve 108. The temperature switch 120 has a threshold temperature Ta, i.e. when the temperature measured by the temperature switch 120 is greater than Ta the temperature switch closes. This causes the electro-valve 108 to open, thus connecting the boiler 102 directly via the steam duct 110 with the iron 112. The second temperature switch 122 opens, when its threshold temperature Tb, e.g. smaller than Ta, is exceeded by the measured temperature. When the water level inside the boiler 102 reduces, and the heating elements 106 are not fully covered by water, the temperature increases. During normal steam operation, the temperature inside the boiler 112 is lower than Tb. In consequence, the heating elements 106 are active, whereas the electro-valve 108 is deactivated and is being triggered only for ejecting steam. In the case of a need for refilling, the temperature inside the boiler 102 is rising and at first is greater than Tb. Thus, the heating elements 106 are turned off by the first temperature switch 120. Afterwards, the temperature exceeds the threshold temperature Ta and the electro-valve 108 is activated and couples the boiler 102 and the steam iron 112. Now, the boiler is being depressurized for allowing the user to open the boiler 102 safely. The temperature relation of Ta and Tb can be arranged the other way round, i.e. Ta is smaller than Tb. In this case, the electro-valve 108 is opened before turning off the heating element 106.

Figure 5:
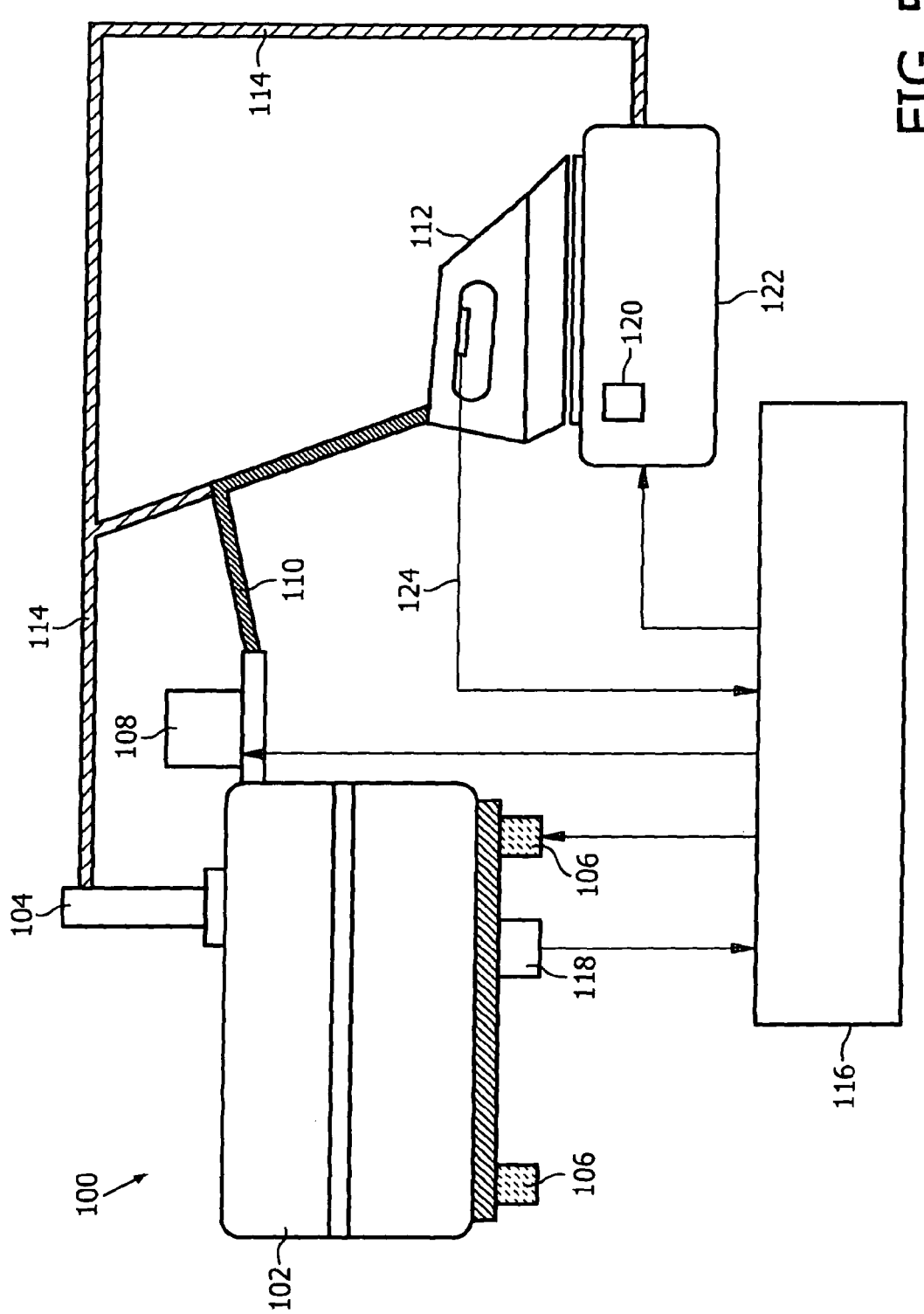
FIG. 5 shows a still further steam generating apparatus.

FIG. 5 shows a still further steam generating apparatus. A thermistor 118 is mounted onto the boiler shell being in thermal contact with the boiler 102. The thermistor 118 may be used to electronically control the system to switch on/off the electro-valve 108 and the power for the heating elements 106 in order to control the water level of the boiler 108. Therefore, an electronic control system 116 is provided. The electronic control system 116 is connected with the thermistor 118, with the heating elements 106, the electro-valve 108 and with an indicator 120 arranged in a stand 122. A boiler-opening request may be provided via the thermistor 118 or alternatively/additionally by a user operable switch, providing a signal via the line 124. The process of turning off the heating element 106 and activating the electro-valve 108 may be performed as discussed above. Thereby, the steam may be ejected via the steam duct 110 or alternatively via a by-pass duct 114, leading to the iron 112 or to the stand 122. Additionally, a third temperature threshold Tc may be used. The electronic control system 116 will then turn on the heating element 106 only, if the temperature inside the boiler 102 less than Tc. Additionally, the electro-valve will only be switched off (i.e. closed), when the temperature is lower than Tc. This will further ensure that the user is safe during opening and refilling of the boiler 102 via the water-filling inlet 104. Additionally, this information may be provided at the indicator 120 showing the user when to refill the boiler 102.

Figure 6:
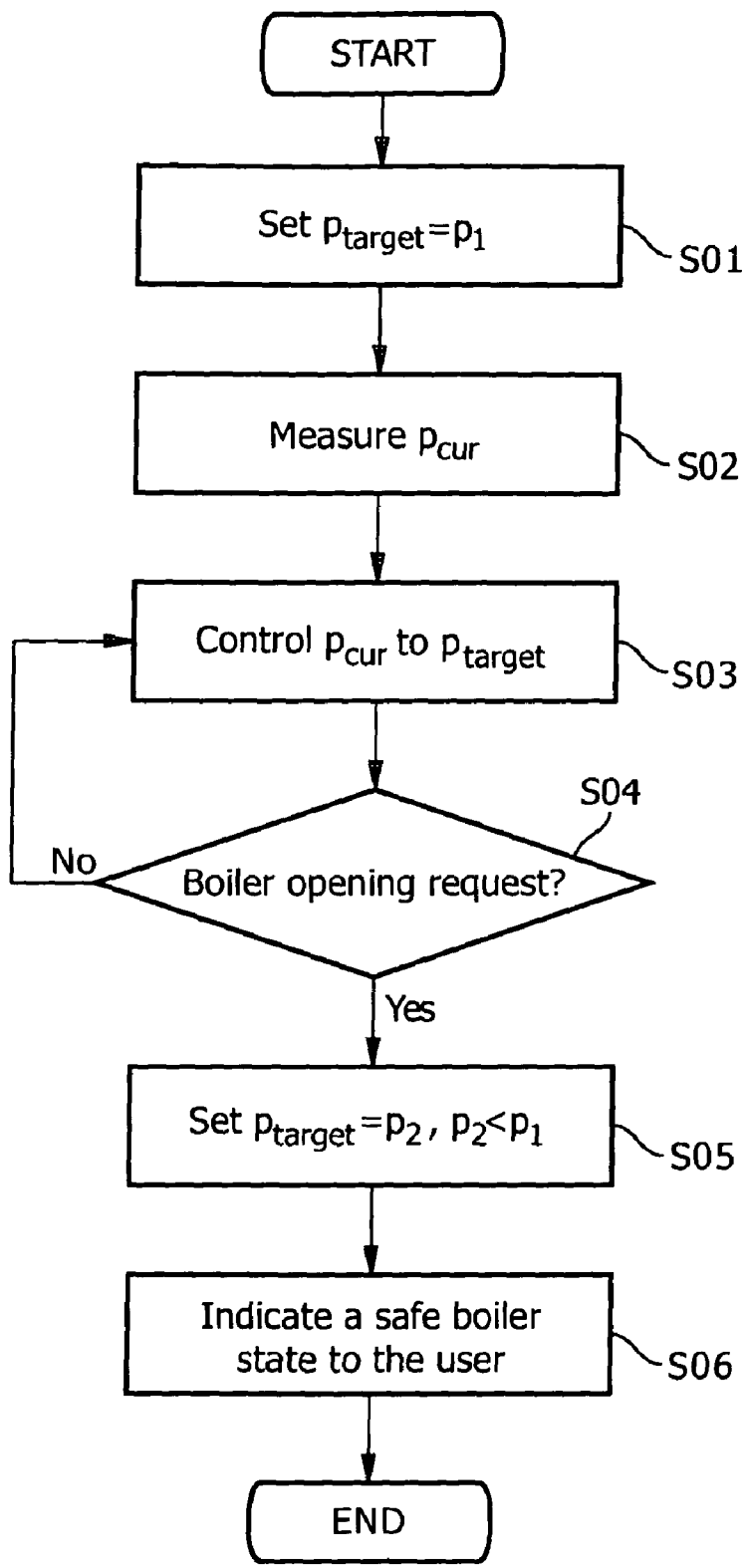
FIG. 6 shows a flow chart of a method of controlling the pressure of steam.

FIG. 6 shows a flow chart of a method of controlling the pressure of steam. In step S01, the target pressure $p_{target}$ is set to a first pressure level $p_1$. The pressure level $p_1$ usually is suitable for generating steam on a continuous basis. In step S02, the current pressure level $p_{cur}$ of the boiler is measured. This may be done by a pressure sensor; alternatively a temperature switch or a thermistor may be utilized. The measured pressure level $p_{cur}$ is compared with the target pressure level $p_{target}$ and the heating power provided to the boiler is adjusted, if appropriate (step S03). In step S04, an indication of a boiler-opening request is determined. If the boiler has to be opened (e.g. the water level is low, the user pushes a button, etc.), the target pressure level is lowered to a target pressure level $p_2$ (step S05). This may be performed by adjusting the heating power or releasing steam, for example. Afterwards, the safe state of the boiler is indicated to the user (step S06). If in step S04 no boiler-opening request is present, the process continues in step S03.

Figure 7:
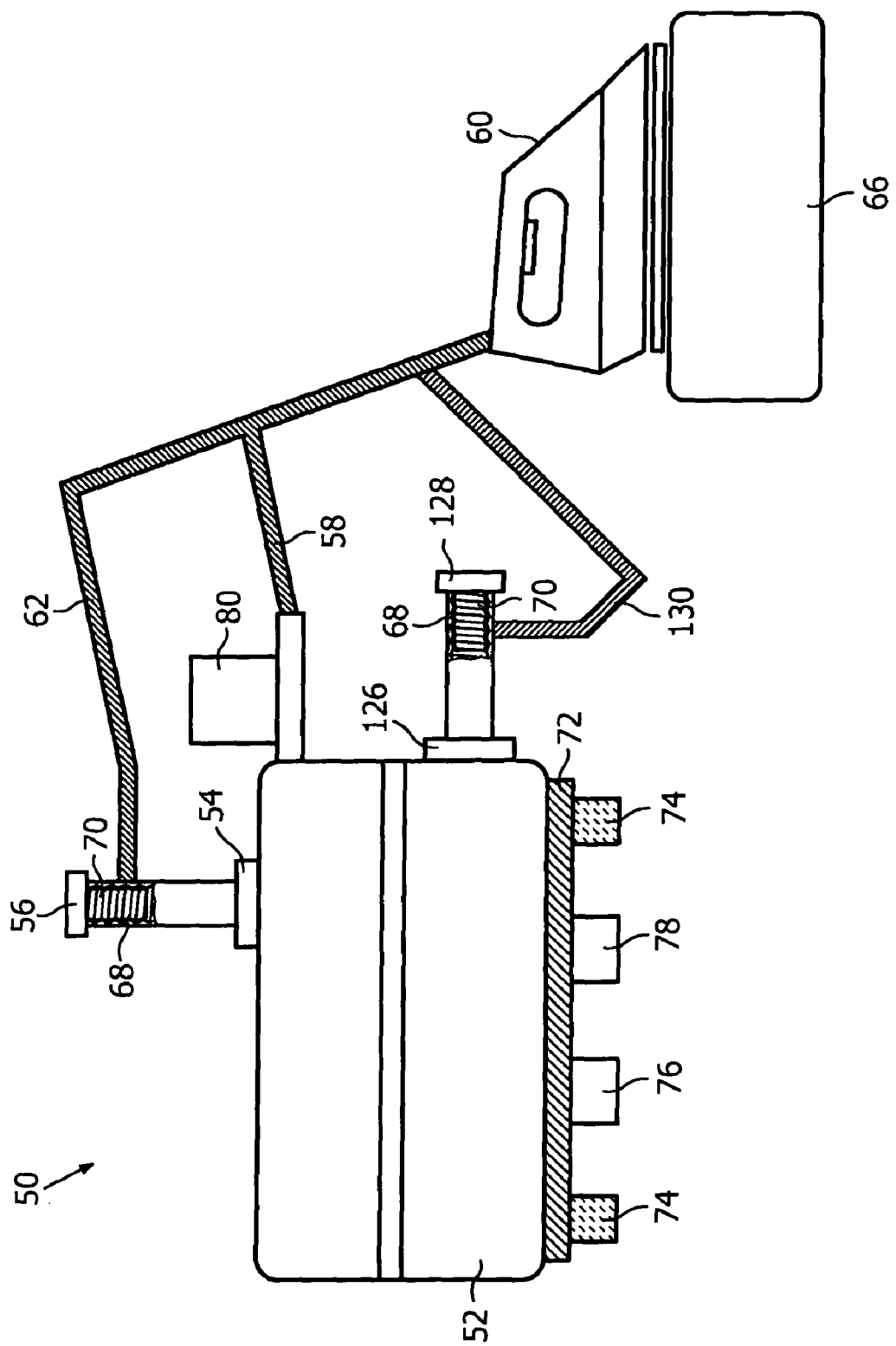
FIG. 7 shows a further steam generating apparatus according to the invention.

FIG. 7 shows a further steam generating apparatus according to the invention. In comparison to the steam generating apparatus according to FIG. 2, the steam generating apparatus has an additional opening 126. While with the steam generating apparatus according to FIG. 2 a rinsing procedure by draining off water from the boiler 52 has to be performed via the opening 54 that is also used for water filling purposes, the steam generating apparatus according to FIG. 7 has a dedicated draining opening 126. The draining opening 126 is closed by a closing means 128 similar to the closing means 56 at the water filling means 54. Additionally to selectively closing the draining opening 126, the closing means 128 selectively closes the by-pass duct 130. This is achieved in a comparable manner as described for the water filling means 54 with reference to FIG. 2.

Figure 8:
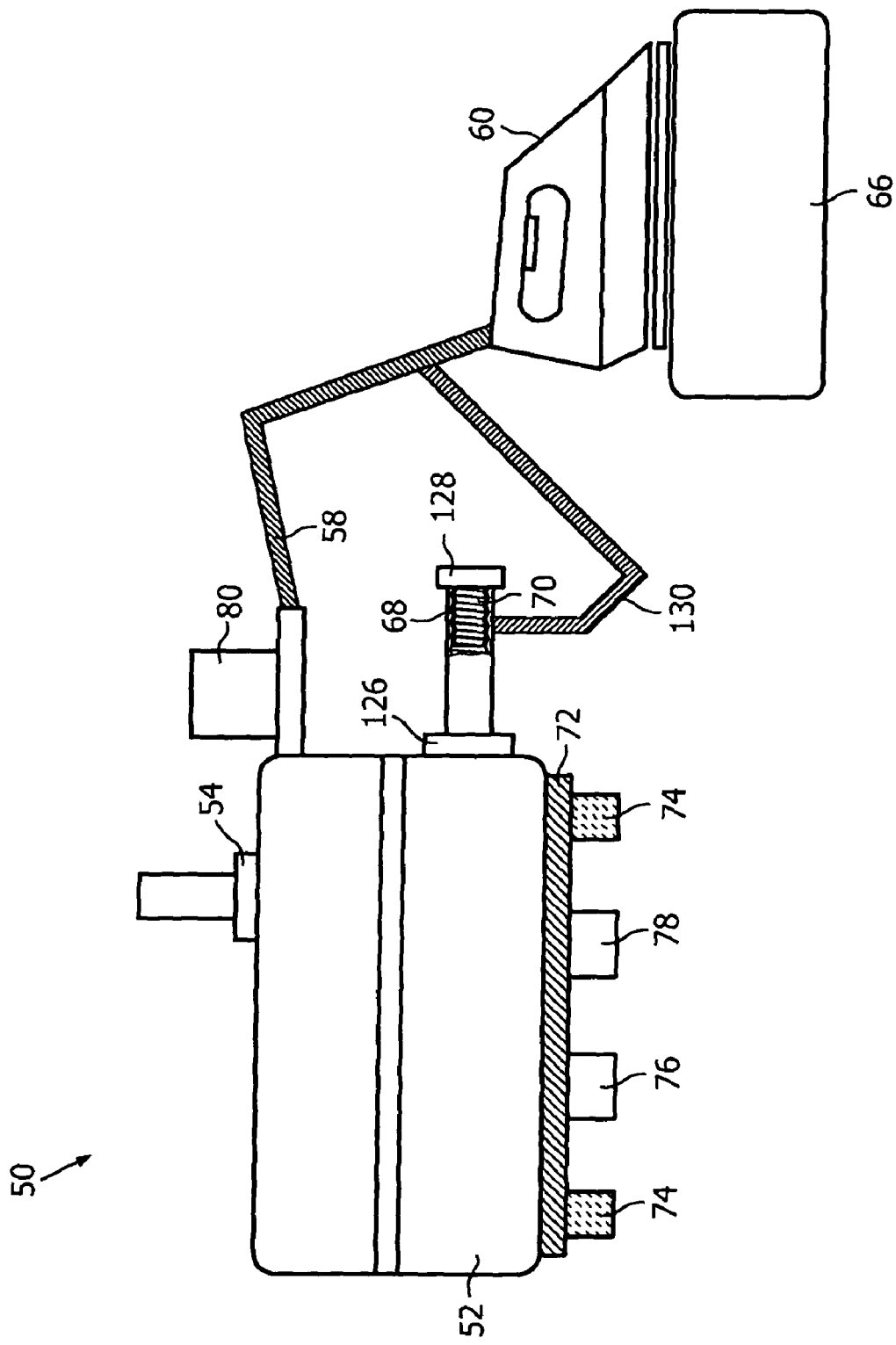
FIG. 8 shows a still further steam generating apparatus according to the invention.

FIG. 8 shows a still further steam generating apparatus according to the invention. While the embodiments described so far are limited systems in the sense that only a limited amount of water is provided and the boiler has to be refilled manually, FIG. 8 shows an unlimited system comprising a boiler connected to an unlimited water supply via a water inlet port. In relation to the remaining features the embodiment of FIG. 8 is comparable to the embodiment of FIG. 7.

Figure 9A:
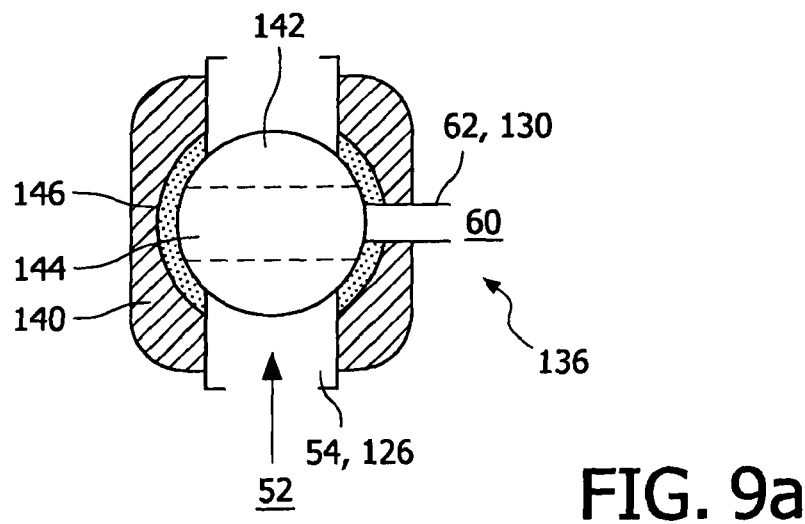
FIG. 9 shows different positions of a valve applicable with the present invention.
Figure 9B:
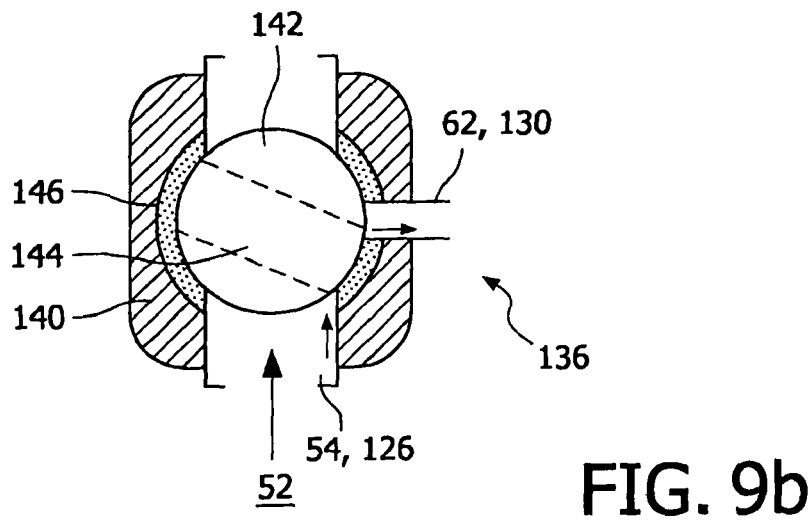
Figure 9C:
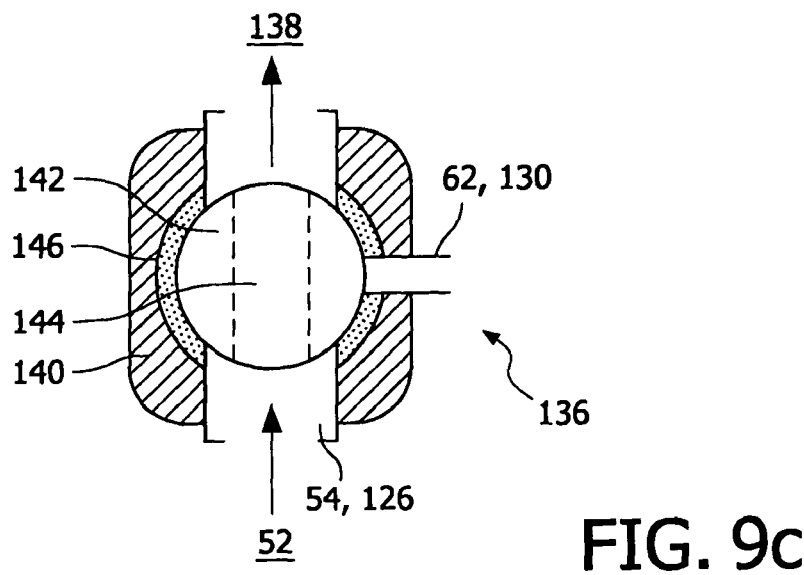

FIG. 9 shows different positions of a valve applicable with the present invention. The valve 136 comprises a valve body 140 and a central valve element 142. The central valve element 142 has a bore 144 and is rotatable within the valve body 140. A sealing 146 is provided in order to selectively connect or disconnect the various ports of the valve 136. One port of the valve is connected to the boiler 52, namely at the boiler opening 54 for filling or at the boiler opening 126 for draining the boiler. A second port is connected to the atmosphere 138. A third port is connected to a by-pass duct 62, 130 leading to the iron 60. The central valve element 142 can be realized as a cylindrically shaped plug or as a ball-type member. In the first position depicted in FIG. 9a the valve 136 is completely closed, hence disconnecting the boiler 52, the atmosphere 138 and the by-pass duct 62, 130. In the second position depicted in FIG. 9b the central valve element 142 has been rotated such that a connection between the boiler 52 and the by-pass duct 62, 130 is provided, while the valve 136 still disconnects the boiler 52 from atmosphere 138. In the third position, depicted in FIG. 9c, the valve 136 connects the boiler 52 with atmosphere 138, thus allowing filling or draining the boiler 52; the by-pass duct 62, 130 is disconnected from the boiler 52. According to an alternative embodiment it is possible that in the third position all ports are connected, thus providing also a connection between atmosphere 138 and the by-pass duct 62, 130.

Figure 10A:
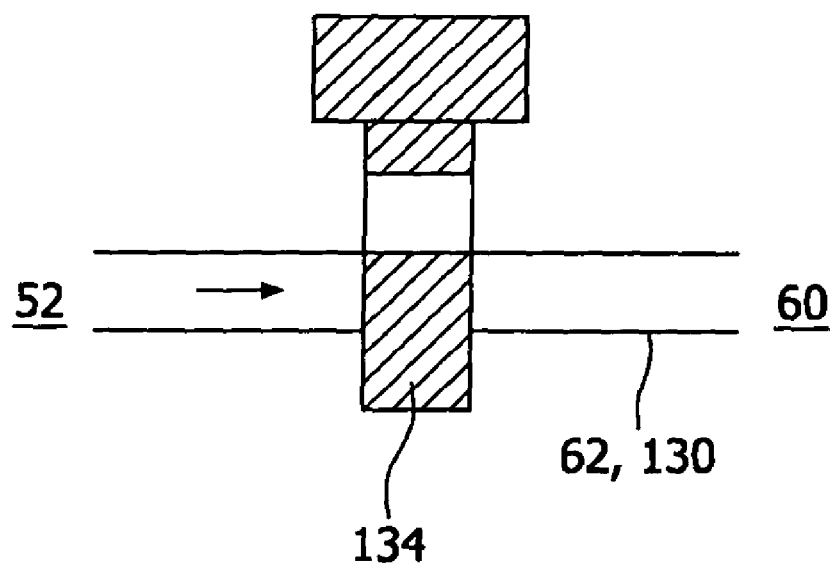
FIG. 10 shows different positions of a push button applicable with the present invention.
Figure 10B:
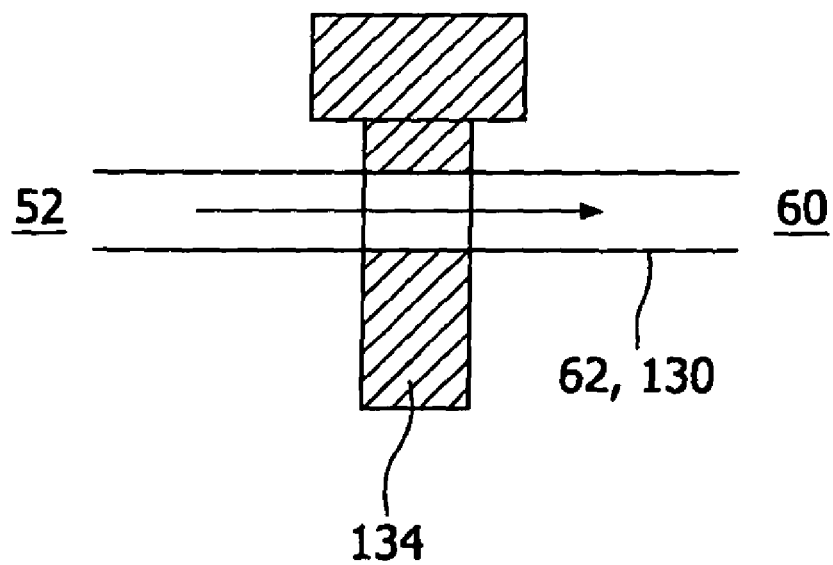

FIG. 10 shows different positions of a push button applicable with the present invention. In the position shown in FIG. 10a a mechanically operable valve 134 closes the by-pass duct 62, 130. By pushing the valve 134 like a push button, the valve can be transferred in the position depicted in FIG. 10b, hence opening the by-pass duct 62, 130. Thus, FIG. 10 shows a possibility to open and close a by-pass duct independently from opening and closing a water filling or draining opening. The essential concept remains, namely exhausting steam from the boiler 52 via the iron 60. Equivalents and modifications not described above may also be employed without departing from the scope of the invention, which is defined in the accompanying claims.

The invention claimed is:

1. A steam generating apparatus comprising:
    a boiler for receiving water to be heated,
    an opening in a wall of the boiler, the opening being closable by closing means,
    a steam duct for conducting steam generated in the boiler to steam applying means, and
    a by-pass duct by-passing the steam duct for discharging steam from the boiler to the steam applying means,
        wherein the opening is a water filling means for manually filling the water into the boiler.

2. The steam generating apparatus according to claim 1, wherein the steam applying means is an iron.

3. A steam generating apparatus comprising:
    a boiler or receiving water to be heated, an opening in a wall of the boiler, the opening being closable by closing means, a steam duct for conducting steam generated in the boiler to steam applying means, and a by-pass duct by-passing the steam duct for discharging steam from the boiler to the steam applying means, wherein the opening is a rinsing outlet for draining off the water from the boiler.

4. The steam generating apparatus according to claim 1, wherein the closing means additionally close the by-pass duct.

5. The steam generating apparatus according to claim 4, wherein the opening and the closing means are connected by a screw thread coupling.

6. The steam generating apparatus according to claim 4, wherein the closing means are realized as a boiler outlet valve to which the by-pass duct is connected, wherein in a first position the outlet valve closes the boiler and disconnects the boiler from the by-pass duct, in a second position, the outlet valve closes the boiler and connects the boiler with the by-pass duct, and in a third position the valve opens the boiler.

7. The steam generating apparatus according to claim 1, wherein the by-pass duct comprises a mechanically operable valve for closing and opening the by-pass duct.

8. A method of operating a steam generating apparatus comprising a boiler for receiving water to be heated, an opening in a wall of the boiler, the opening being closable by closing means, and a steam duct for conducting steam generated in the boiler to steam applying means, the method comprising the acts of:

discharging steam through a by-pass duct by-passing the steam duct from the boiler to the steam applying means; and at least one the acts of manually filling the water into the boiler through the opening; and draining off the water from the boiler through the opening.

9. The method according to claim 8, wherein the act of discharging is performed by opening a closing means that is provided for closing a water filling and/or draining opening of the boiler.

\* \* \* \* \*